(12) United States Patent
Lowe (10) Patent No.: US 11,823,287 B2
(45) Date of Patent: Nov. 21, 2023

(54) OUTSTANDING CHECK ALERT

(71) Applicant: Capital One Services, LLC, McLean, VA (US)

(72) Inventor: Kevin Lowe, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 22 days.

(21) Appl. No.: 17/400,658

(22) Filed: Aug. 12, 2021

(65) Prior Publication Data

US 2023/0049335 A1 Feb. 16, 2023

(51) Int. Cl.
| | | |
|---|---|---|
| *G06Q 40/12* | (2023.01) | |
| *G06Q 40/02* | (2023.01) | |
| *G06Q 20/40* | (2012.01) | |
| *G06N 20/00* | (2019.01) | |
| *G06Q 20/04* | (2012.01) | |
| *G06F 40/205* | (2020.01) | |
| *G06F 18/214* | (2023.01) | |

(52) U.S. Cl.
CPC ....... *G06Q 40/128* (2013.12); *G06F 18/2155* (2023.01); *G06F 40/205* (2020.01); *G06N 20/00* (2019.01); *G06Q 20/042* (2013.01); *G06Q 20/401* (2013.01); *G06Q 40/02* (2013.01)

(58) Field of Classification Search
CPC .. G06Q 40/128; G06Q 20/042; G06Q 20/401; G06Q 40/02; G06Q 20/4016; G06Q 30/0201; G06Q 20/386; G06Q 20/405; G06F 40/205; G06F 18/2155; G06N 20/00
See application file for complete search history.

(56) References Cited

U.S. PATENT DOCUMENTS

| | | |
|---|---|---|
| 10,475,100 B1 | 11/2019 | Herz et al. |
| 10,990,980 B1 | 4/2021 | Reses et al. |
| 10,992,765 B2 | 4/2021 | Kursun |
| 2014/0330708 A1* | 11/2014 | Felse ..................... G06Q 30/04 705/40 |

* cited by examiner

*Primary Examiner* — Peter Ludwig
*Assistant Examiner* — Avia Salman
(74) *Attorney, Agent, or Firm* — Banner & Witcoff, Ltd.

(57) ABSTRACT

Systems as described herein generate an outstanding check alert. An alert generating server may receive transaction records associated with a plurality of checking accounts. The alert generating server may user a first machine learning classifier to determine a transaction pattern indicating a merchant has failed to process outstanding checks for a period of time. The alert generating server may receive sequential check information comprising at least one missing check number associated with a particular checking account. The alert generating server may user a second machine learning classifier to determine at least one outstanding check associated with the particular checking account. The alert generating server may send an alert indicating the at least one outstanding check to a user device.

20 Claims, 8 Drawing Sheets

OUTSTANDING CHECK ALERT

FIELD OF USE

Aspects of the disclosure relate generally to big data and more specifically to the processing and management of big data.

BACKGROUND

In an electronic payment processing network, a financial institution may receive transaction data related to a variety of checking accounts. Some merchants, particularly some small business merchants may fail to process the checks in a reasonable period of time. Customers may not be aware of an outstanding check until a late fee has been incurred. Conventional financial systems may not have a mechanism to manage the outstanding checks proactively, thereby limiting their ability to provide visibility to the outstanding checks and to generate and send alerts to their customers to use an alternative payment method.

Aspects described herein may address these and other problems, and generally improve the quality, efficiency, and speed of processing big data to identify merchants that may have a delay in processing outstanding checking so that a notification may be sent to customers to allow them to manage their checking accounts proactively and make informed decisions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for generating an outstanding check alert. An alert generating system may receive transaction records associated with a plurality of checking accounts from a plurality of users. Based on the transaction records and using a first machine learning classifier, the alert generating system may determine a transaction pattern indicating a merchant has failed to process outstanding checks for a period of time (e.g. a week, two weeks, or a month). The alert generating system may receive sequential check information including at least one missing check number associated with a particular checking account. Based on the transaction pattern and the sequential check information, the alert generating system may use a second machine learning classifier to determine at least one outstanding check associated with the particular checking account for the period of time. The alert generating system may send, to a second device associated with a user, an alert indicating the at least one outstanding check.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of being used in other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for generating an outstanding check alert. Prior to determining the transaction pattern, the alert generating system may use a scraping algorithm to retrieve compiled information associated with merchants in a geographic area. The compiled information may include weather information, information associated with a natural disaster or a pandemic in the geographic area. The alert generating system may parse the compiled information to identify one or more keywords. For example, the alert generating system may parse the compiled information using natural language processing (NLP). The alert generating system may convert the compiled information from a first data format to a second data format, and analyze compiled information in the second data format to determine the one or more keywords. The alert generating system may determine the one or more keywords using term frequency-inverse document frequency (TFIDF) analysis. Based on the one or more keywords and the transaction records, the alert generating system may determine from the transaction pattern that the merchant has failed to process outstanding checks for the period of time.

In many aspects, prior to using the first machine learning classifier, the alert generating system may use training data including a set of pre-labelled outstanding checks, to train the first machine learning classifier to output a detected transaction pattern. The transaction records may be provided as input to the trained first machine learning classifier. The transaction pattern may be received as output from the trained first machine learning classifier and the transaction patter may indicate that the merchant has failed to process outstanding checks for the period of time.

In many aspects, prior to using the second machine learning classifier, the alert generating system may use training data including a set of checks with corresponding check numbers that are out of sequence to train the second machine learning classifier to output predicted outstanding checks. The sequential check information may be provided as input to the trained second machine learning classifier. The at least one outstanding check corresponding to the at least one missing check number may be received as output from the trained second machine learning classifier.

In many aspects, the alert generating system may analyze historical transactions of the particular checking account including one or more recurring transactions. The alert generating system may determine the at least one outstanding check based on the one or more recurring transactions. After determining that a particular account has at least one outstanding check, the alert generating system may send a recommendation to use an alternative payment method.

Outstanding Check Alerting Systems

Figure 1:
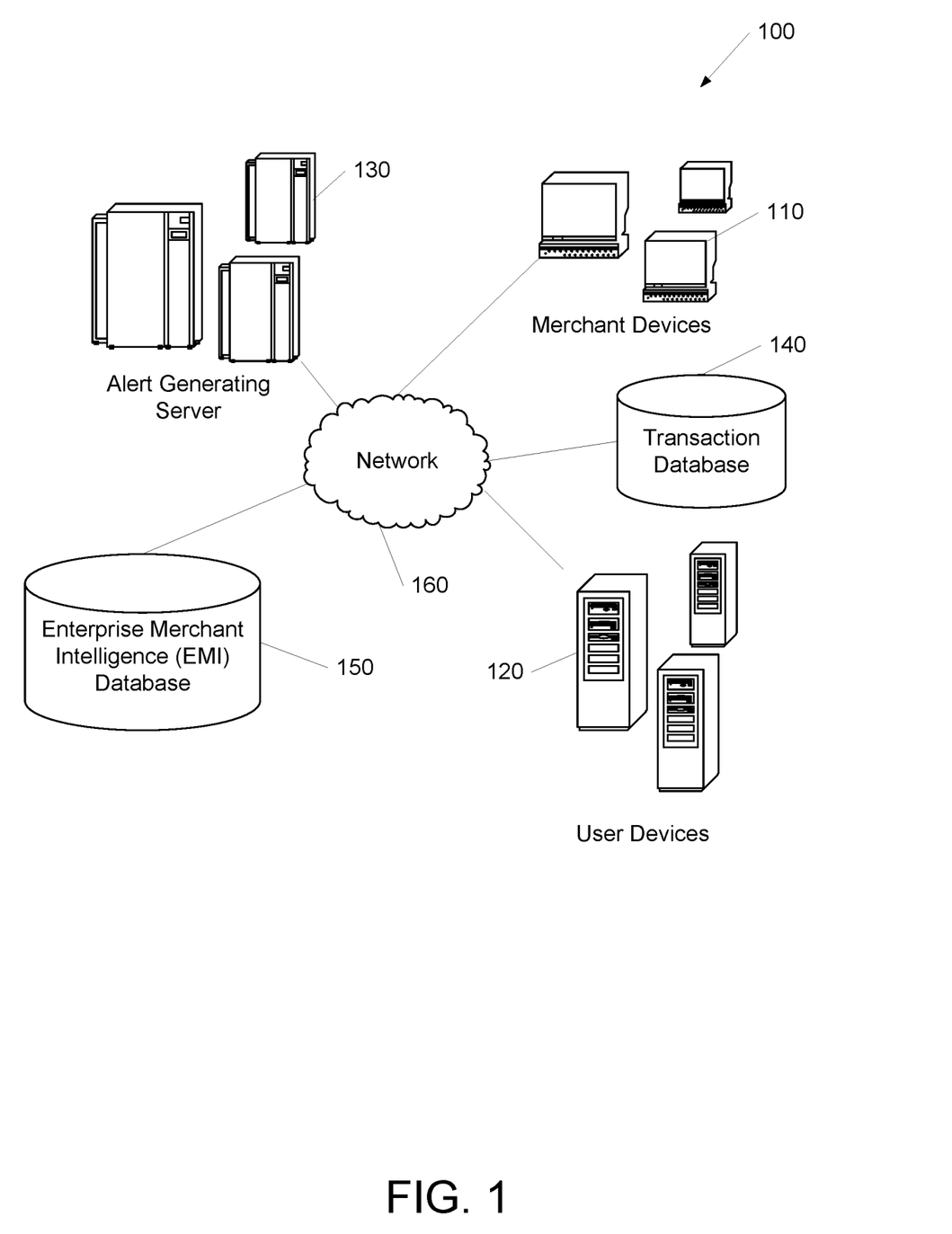
FIG. 1 shows an example of a system for generating an outstanding check alert in which one or more aspects described herein may be implemented.

FIG. 1 shows an example of an alert generating system 100 where the outstanding check alert may be generated. The system 100 may include a network 160 coupled to one or more merchant devices 110, one or more user devices 120, at least one alert generating server 130, at least one transaction record database 140, and/or at least one enterprise merchant intelligence (EMI) database 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, LTE, and 5G is presumed, and the various computing devices described herein may be configured to communicate using any of these network protocols or technologies. Any of the devices and systems described herein may be implemented, in whole or in part, using one or more computing systems described with respect to FIG. 2.

Merchant devices 110 may process a check associated with a checking account and submit a transaction record related to the checking account such as an account identifier, a transaction amount, a merchant identifier, and/or a timestamp when the check was processed or submitted for authorization. Merchant devices 110 may send requests for authorization for transactions for payments as reflected in a transaction record. Some merchant devices 110 may be located at a small business merchant, such as a convenience store, a coffee shop, a gas station, a farmer's market, etc. Some merchants may include government agencies that may accept and process payments such as property tax, or other government related charges. Some merchant devices 110 may be located at an educational institution or a university that may process transactions related to tuition payment. These merchants may have delays in processing one or more check payments and cause the checks to be outstanding for a prolonged period of time. For example, extreme weather conditions, a natural disaster, political upheaval, or a pandemic may affect merchants in a geographic area and cause delays in the processing of corresponding payments. In another example, a cyberattack may cause a disruption to business operations of some merchants and the checks made to these merchants may be outstanding for a prolonged period of time.

User devices 120 may be any device that belongs to a customer of a financial institution. The customers may conduct transactions with merchant devices 110 using user devices 120 and/or a checkbook associated with a checking account and issued by the financial institution. For example, a customer may make a tuition payment by writing a check using the checkbook and mail the check to the merchant. The user may write a check, scan the check and use one of user devices 120 to send the check to one or merchant devices 110 associated with the merchant. User devices 110 may receive notification whether there is a delay in a merchant processing the check. For example, user devices 110 may display an alert for the outstanding check, which may ask the user to confirm whether the check is void or has been sent to a merchant and is outstanding for a period time (e.g. for two weeks or 30 days). After the user sends a confirmation for an outstanding check in response to the alert, user devices 110 may receive a notification recommending an alternative payment method, such as making an online payment.

User devices 110 may include computing devices, such as laptop computers, desktop computers, mobile devices, smart phones, tablets, and the like. According to some examples, user devices 110 may include hardware and software (e.g., an application) that allow them to connect directly to network 160. Alternatively, user devices 110 may connect to a local device, such as a personal computer, server, or other computing device, which connects to network 160.

Alert generating server 130 may receive transaction records from merchant devices 110 for a plurality of merchants. These transaction records may relate to a plurality of checking accounts associated with various users. Alert generating server 130 may use a scraping algorithm to retrieve compiled information associated with merchants in a geographic area. The compiled information may include weather information, information associated with a natural disaster, political upheaval, or a pandemic in the geographic area or a cyberattack that may cause operation disruptions at one or more merchants. For example, alert generating server 130 may use a web scraper such as Python script to retrieve content and metadata from various web sites related to news services, weather services and merchant home pages. Alert generating server 130 may use a scraping algorithm to retrieve information related to news, weather or merchants in a flat file or database system. Alert generating server 130 may convert the compiled information from a first data format (e.g. a text format or unstructured format) into a standard format (e.g. JSON or XML format). Alert generating server 130 may parse the information using natural language processing (NLP) to identify one or more keywords. Alert generating server 130 may also parse the information using frequency-inverse document frequency (TFIDF) analysis to identify one or more keywords.

Alert generating server 130 may use a first machine learning classifier to determine a transaction pattern based on the transaction records. The transaction pattern may indicate that a merchant has failed to process outstanding checks for a period of time. Based on the one or more keywords and the transaction records, alert generating server 130 may determine the transaction pattern that a merchant has failed to process outstanding checks for a predetermined period of time. Prior to using the first machine learning classifier, alert generating server 130 may use training data including a set of pre-labelled outstanding checks to train the first machine learning classifier. The first machine learning classifier may output a detected transaction pattern. Alert generating server 130 may provide the transaction records as input to the trained first machine learning classifier. Alert generating server 130 may receive the transaction pattern as output from the trained first machine learning classifier, where the transaction pattern may indicate that a merchant has failed to process outstanding checks for the period of time. For example, alert generating server 130 may determine that the City of Richmond has failed to process checks related to property tax payments from multiple checking accounts for 30 days.

Alert generating server 130 may receive sequential check information including at least one missing check number associated with a particular checking account. For example, a user may write a series of six checks with the corresponding check number 101, 102, 103, 104, 105 and 106 over a month-long period. Alert generating server 130 may determine that five checks 101, 102, 104, 105 and 106 have been processed by various merchants. Alert generating server 130 may determine that check number 103 has not been processed by a merchant and the check number is still missing from the transaction records associated with this particular checking account.

Alert generating server 130 may use a second machine learning classifier to determine at least one outstanding check associated with the particular checking account for the period of time, based on the transaction pattern and the sequential check information. Prior to using the second machine learning classifier, alert generating server 130 may use training data including a set of checks with corresponding check numbers that are out of sequence to train the second machine learning classifier. The second machine learning classifier may output predicted outstanding checks based on the training data. Alert generating server 130 may provide the sequential check information as input to the trained second machine learning classifier. Alert generating server 130 may receive at least one outstanding check as output and the outstanding check may correspond to the at least one missing check number for the period of time. Alert generating server 130 may analyze historical transactions of the particular checking account. The historical transactions may include one or more recurring transactions. Alert generating server 130 may determine the at least one outstanding check based on the one or more recurring transactions. For example, the second machine learning classifier may output that check 103 may be related to a bi-annual payment of property tax to the City of Richmond. Given that the City of Richmond has failed to process various checks in the last month, check 103 may be an outstanding check that needs further attention.

Alert generating server 130 may send an alert indicating the at least one outstanding check to user devices 120. For example, alert generating server 130 may determine a user device 120 associated with the checking account that has an outstanding check 103. Alert generating server 130 may send an alert to the user device 120 asking the user to confirm whether check 103 is indeed outstanding or just a void check. Alert generating server 130 may also send a notification recommending an alternative payment method (e.g. making an online payment or using a credit card) while the City of Richmond is trying to resolve the issues related to outstanding checks.

Transaction database 140 may store transaction records related to transactions previously conducted by users from a plurality of merchants. These transaction records may be related to payments made by the users using their checking accounts. Transaction database 140 may receive a request from alert generating server 130 and retrieve the corresponding transaction records associated with various checking accounts. The transaction records may each contain an account identifier, a transaction amount, a transaction timestamp, a merchant identifier, etc. Transaction database 140 may store transaction records from merchants that have successfully processed the checks. However, the absence of such information in transaction database 140 may indicate that some merchants have failed to process outstanding checks for a prolonged period of time. For example, transaction database 140 may contain transaction records of property tax payments from numerous checking accounts to the City of Richmond in January, February and March. Transaction database 140 may contain a few or no transaction records of property tax payments to the City of Richmond using checking accounts in April. Transaction database 140 may contain numerous transaction records of property tax payments to the City of Richmond using credit cards in April.

Transaction database 140 may store training data to train the first and second machine learning classifiers. For example, transaction database 140 may contain a set of pre-labelled checks that have been outstanding for a prolonged period of time. Such pre-labelled checks may be reported by the users who hold a checking account with the financial institution. Transaction database 140 may contain transaction records corresponding to a set of checks with their check numbers that are out of sequence. These checks may not be processed sequentially based on their check numbers, and the transaction records may contain one or more missing check numbers. Transaction database 140 may send the training data as input to the machine learnings classifiers.

Enterprise merchant intelligence (EMI) database 150 may store merchant records related to various merchants, including small business merchants. EMI database 150 may be a merchant database that stores enterprise merchant intelligence records, which may in turn include a merchant identifier, a friendly merchant name, a zip code, a physical address, a phone number, an email or other contact information of the merchants, and/or a merchant category code (MCC). A MCC may be a four-digit number listed in ISO 18245 for retail financial services used to classify a business by the types of goods and/or services it provides. The merchant records may be collected from public resources and/or merchant reported records.

In a variety of embodiments, a financial organization may build a proprietary EMI database 150, for example, based on an aggregation of transaction records in transaction database 150. As a transaction arrives from a transaction account, the corresponding transaction record may be processed, cleaned, and/or enhanced with a variety of services. For example, when a financial institution receives the transaction information from a checking account, the transaction information may be in the form of a line of data that offers limited information about the transaction, with each piece of information appearing in certain locations within the line of data. The merchant identifier may appear in a specific location and may include 8-10 characters in the abbreviated form, which may not be readily recognizable as a meaningful merchant name, particularly for small business merchants. The financial institution may process this abbreviated merchant identifier and convert it into a meaningful merchant name in a human readable format, and store it in EMI database 150.

In a variety of embodiments, a financial institution may use a third party API to gather merchant information, such as a merchant address or contact information, to be stored in EMI database 150. In a variety of embodiments, a financial organization may maintain more static merchant information, such as a merchant identifier and MCC, in its proprietary EMI database 150; and a financial institution may use the third-party API to get merchant address, merchant social media handle, or other merchant information that may change over time. Alert generating server 130 may store in EMI database 150, one or more transaction patterns related to the merchants with the corresponding timeframes. For example, a red flag may be assigned to a merchant that has failed to process checking for two weeks.

Merchant devices 110, user devices 120, alert generating server 130, transaction database 140, and/or EMI database 150 may be associated with a particular authentication session. Alert generating server 130 may receive, process, and/or store a variety of transaction records, enterprise merchant intelligence information, transaction patterns, and sequential check information, and/or receive transaction records with merchant devices 110 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the alert generating system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Computing Devices

Figure 2:
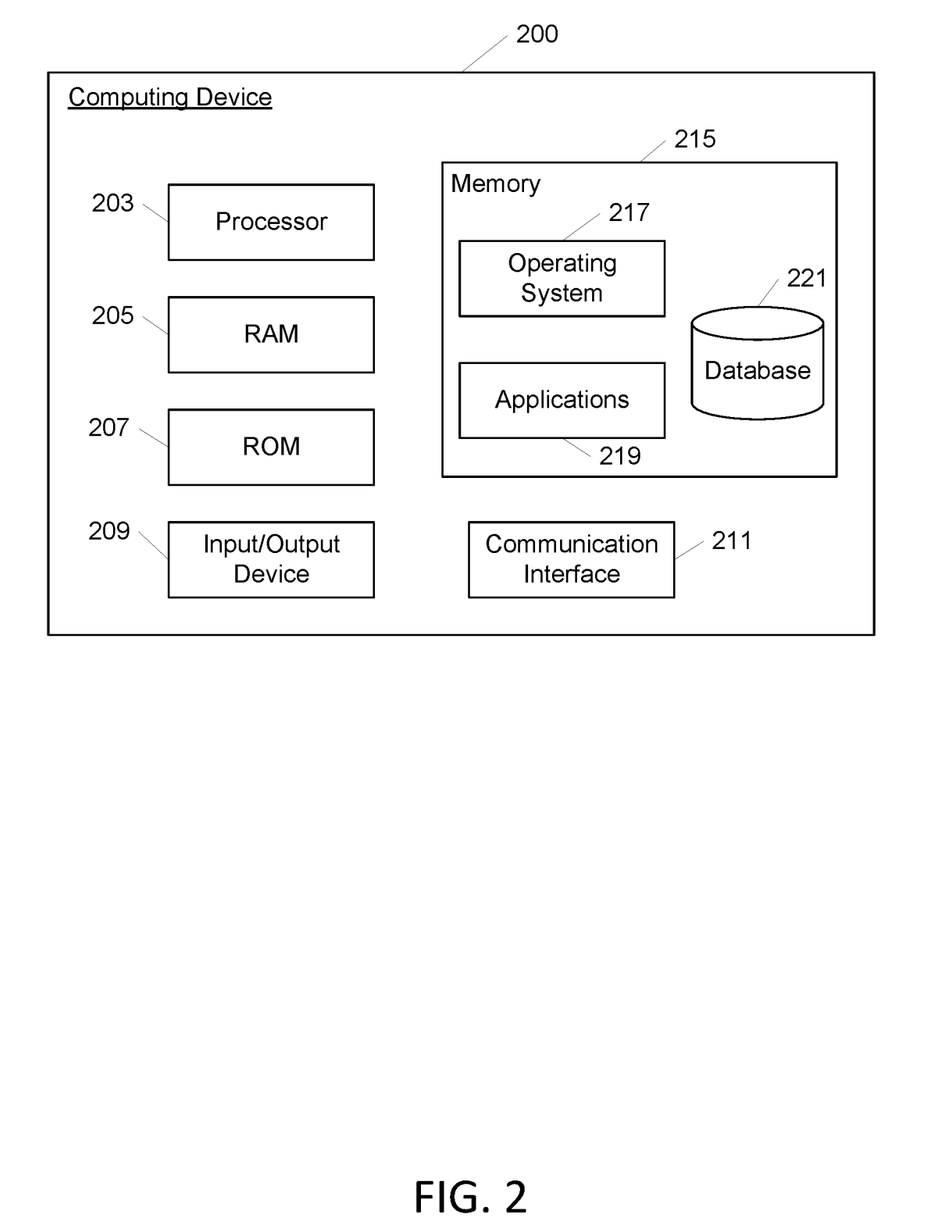
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, and removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Deep Neural Network Architecture

Figure 3:
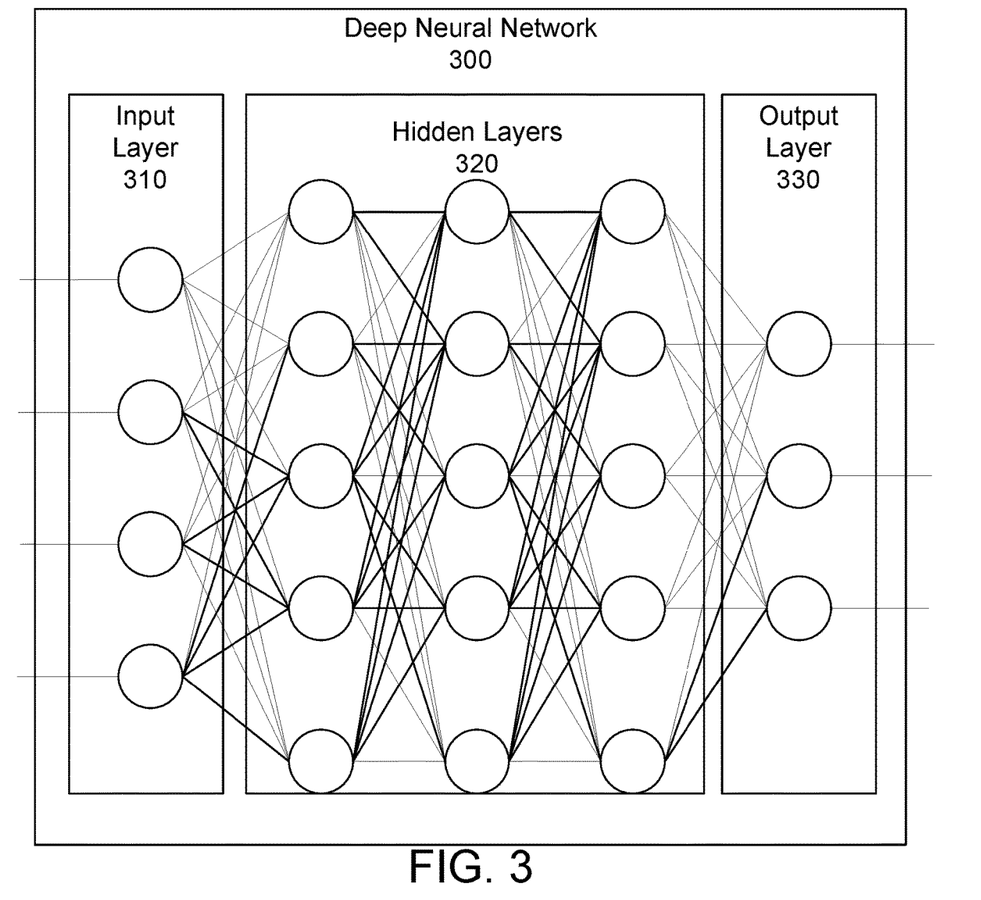
FIG. 3 depicts an example deep neural network architecture for a machine learning classifier according to one or more aspects of the disclosure.

FIG. 3 illustrates an example deep neural network architecture 300 for a machine learning classifier. Such a deep neural network architecture may be implemented by a computing device 200 shown in FIG. 2. That said, the architecture depicted in FIG. 3 need not be performed on a single computing device, and might be performed by, e.g., a plurality of computers. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 310, one or more hidden layers 320, and an output layer 330. A deep neural network, as used herein, may be an artificial network that has more than one hidden layer. Illustrated network architecture 300 is depicted with three hidden layers, and thus may be considered a deep neural network. The number of hidden layers employed in deep neural network 300 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Generating Outstanding Check Alert

The alert generating system 100 may process transaction records related to tens of thousands of checking accounts and merchants, including small business merchants to determining outstanding checks. Based on the transaction records in aggregation and compiled information that may impact the merchants in a geographic area, the alert generating system 100 may determine a common transaction pattern on a merchant using a first machine learning classifier. Based on sequential check information, the alert generating system 100 may determine whether a check may be outstanding using a second machine learning classifier. The alert generating system 100 may send a notification to a user device that the merchant may have a problem processing the check and may recommend the user to use alternative payment methods.

Figure 4:
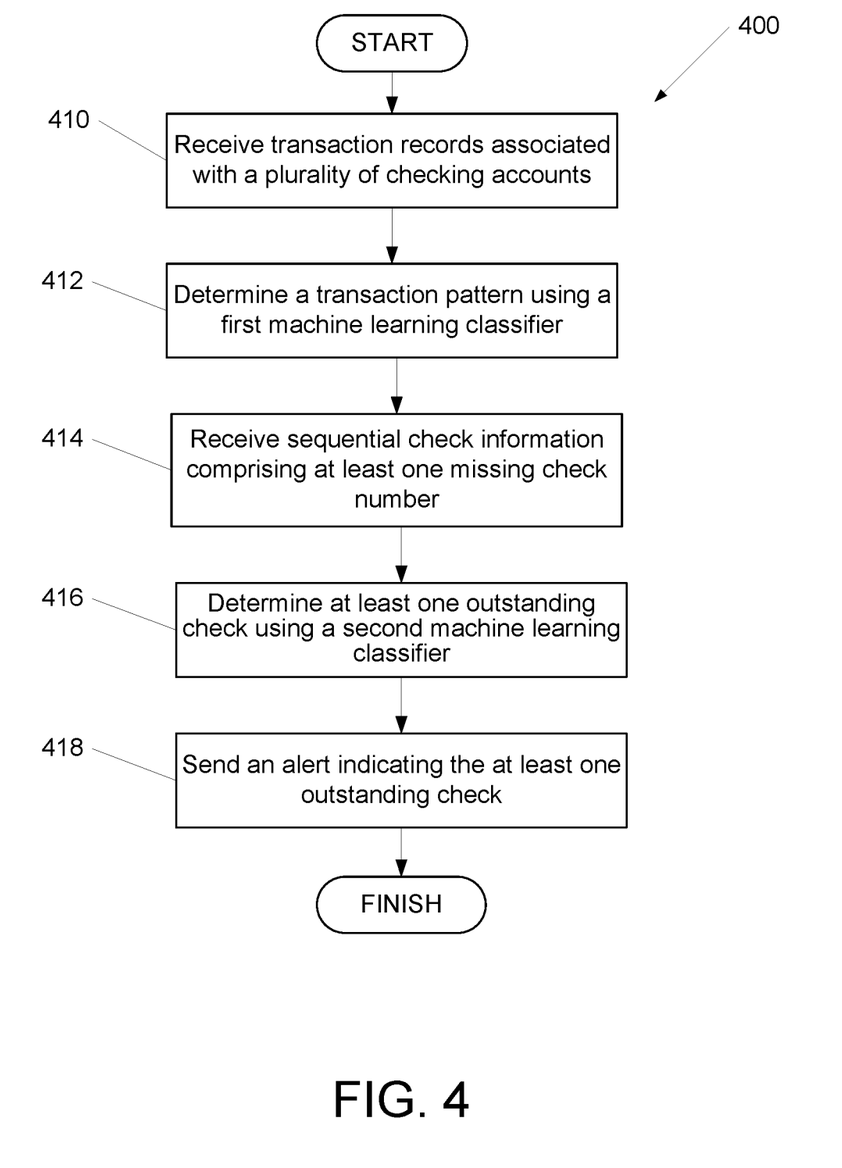
FIG. 4 shows a flow chart of a process for generating an outstanding check alert according to one or more aspects of the disclosure.

FIG. 4 shows a flow chart of a process for generating outstanding check alert according to one or more aspects of the disclosure. Some or all of the steps of process 400 may be performed using one or more computing devices or the machine learning classifier architecture as described herein.

At step 410, the determination server may receive transaction data associated with a plurality of checking accounts. The transaction data may be generated from a plurality of users and/or received via an electronic payment network. Upon receiving a check from a user for a payment in exchange for goods or services provided by the merchant, or for a payment of tuition or government-imposed fees, the merchant may process the check within a reasonable period of time. The merchant may send the transaction record related to the check payment to a financial institution for authorization to transfer the funds from the user's checking account to the merchant. The merchants may include some small business merchants, such as a convenience store, a coffee shop, a gas station, a farmer's market, etc. Also, the merchants may include universities or government agencies. For example, customers of a financial institution may use their checking accounts to make bi-annual payments for property tax to the City of Richmond. The merchant may incur some delay in processing the checks and the checks may become outstanding for a prolonged period of time. For example, a natural disaster or a pandemic may cause s disruption to the operation of the merchant, which may in turn cause a plurality of checks to be outstanding, for example, for two weeks or a month. Such delays may not be readily visible to the financial institutions, and their customers may not be well-informed or offered alternative options to deal with such delays ahead of time.

In a variety of embodiments, the transaction data may be retrieved from a transaction database maintained by a financial institution. The transaction data may include an identifier of a checking account, a transaction identifier, a transaction amount, a merchant identifier, and/or a transaction timestamp when the check was processed by the merchant or submitted to a financial institution for authorization. In some examples, the transaction data may be received from a merchant when a check related to the transaction was sent to the financial institution.

In a variety of embodiments, the alert generating server may retrieve transaction data related to merchants in a certain geographic area. The determination server may retrieve the transaction record containing a merchant identifier from the transaction database. The alert generating server 130 may also retrieve the merchant name corresponding to the merchant identifier from an EMI database 150. The alert generating server 130 may retrieve the geographic area of the merchant from the EMI database 150 based on the merchant identifier. The alert generating server 130 may use a scraping algorithm to retrieve the geographic area of the merchant from a merchant website. The alert generating server 130 may use the scraping algorithm to retrieve compiled information associated with merchants in the geographic area. The compiled information may include weather information, information associated with a natural disaster, political upheaval, or a pandemic in the geographic area or a cyberattack that may cause operation disruptions at one or more merchants. For example, the alert generating server 130 may use a web scraper such as Python script to retrieve content and metadata from various web sites related to news services, weather services and merchant home pages, or from a flat file or database system. The alert generating server 130 may convert the compiled information from a first data format (e.g. a text format or unstructured format) into a standard format (e.g. JSON or XML format). The alert generating server 130 may parse the information using natural language processing (NLP) to identify one or more keywords. Alert generating server 130 may also parse the information using frequency-inverse document frequency (TFIDF) analysis to identify one or more keywords. For example, the alert generating server 130 may filter out certain stop words from the compiled information, such as "that's, the, are, to" to adjust for the fact that some words may appear more frequently in general. The alert generating server 130 may filter the stop words using, for example, TFIDF, which may be a numerical statistic model that may reflect how important a word is to a document in a collection or corpus. For example, the alert generating server 130 may determine keywords related to service disruptions or business closures caused by a pandemic in the City of Richmond area.

At step 412, the alert generating server may use a first machine learning classifier to determine a transaction pattern. The transaction pattern may indicate that a merchant has failed to process outstanding checks for a period of time. The transaction pattern may be determined based on the transaction records related to a plurality of checking accounts and the keywords in the compiled information. For example, based on the transaction records related to banking customers in the City of Richmond, and the keywords of flooding or a pandemic in the area, the alert generating server 130 may attempt to determine that one or more merchants in the Richmond area may have failed to process outstanding checks in a period of time.

In a variety of embodiments, the alert generating server 130 may use training data including a set of pre-labelled outstanding checks to train the first machine learning classifier. The training data may be retrieved from the transaction database. For example, the pre-labelled outstanding checks may be reported by banking customers of a financial institution and were saved in the transaction database with the labels indicating they are outstanding checks that were not processed within a month. The banking customers may have made requests to cancel these outstanding checks. Alternatively, the financial institution may monitor the sequential check numbers for a checking account, and determine there were missing check numbers. The financial institution may ask the banking customers to confirm whether they were outstanding checks. The first machine learning classifier may output a detected transaction pattern based on the pre-labelled outstanding checks. For example, the transaction pattern may indicate a merchant has prolonged delay in processing outstanding checks. The alert generating server may provide the transaction records as input to the trained first machine learning classifier. The alert generating server 130 may also provide other input such as keywords in the compiled information to the trained first machine learning classifier. Subsequently, the alert generating server 130 may receive the transaction pattern as output from the trained first machine learning classifier, where the transaction pattern may indicate that a merchant has failed to process outstanding checks for the period of time. For example, the trained first machine learning classifier 130 may determine that the City of Richmond has failed to process checks related to property tax payments in the last two weeks.

At step 414, the alert generating server 130 may receive sequential check information associated with a particular checking account. The sequential check information may include at least one missing check number. For example, the alert generating server 130 may monitor the cleared check numbers in the transaction stream for the particular check account. The alert generating server 130 may notice that five checks with check numbers 101, 102, 104, 105, 106 and 108 have been processed by various merchants in the last month for this checking account. However, the alert generating server 130 may determine that check number 103 has not been processed by any merchant and this check number is still missing from transaction records associated with this particular checking account.

At step 416, the alert generating server 130 may use a second machine learning classifier to determine at least one outstanding check associated with the particular checking account based on the transaction pattern and the sequential check information. The check may be outstanding for a period of time, such as two weeks, a month, two months or a quarter. The sequential check information may contain one or more missing check numbers associated with the particular checking account. The outstanding check may correspond to the missing check number. The alert generating server 130 may analyze historical transactions of the particular checking account, and the historical transactions may include one or more recurring transactions. The alert generating server 130 may determine the outstanding check based on the one or more recurring transactions. For example, based on the historical transactions of the check account, the alert generating server 130 may determine that the banking customer usually makes recurring (e.g. two bi-annual) payments for property tax to the City of Richmond via the checking account. The alert generating server 130 may determine that the property tax payment is due in the next few weeks based on historical payment history. The alert generating server 130 may attempt to determine whether check number 103 is related to an outstanding check.

In a variety of embodiments, the alert generating server 130 may use training data including a set of checks with corresponding check numbers that are out of sequence to train the second machine learning classifier. For example, the training data may be transaction records retrieved from the transaction database. The transaction records may contain fields indicating a check number and a timestamp for each check that has been cleared by the financial institution. The training data may also include outstanding checks that have not been cleared by the financial institution. Based on the training data, the second machine learning classifier may output predicted outstanding checks. The alert generating server 130 may provide the sequential check information as input to the trained second machine learning classifier. The alert generating server 130 may provide additional input such as historical recurring payments, and the elapsed time between the timestamps when two consecutive checks were cleared. The alert generating server 130 may receive at least one outstanding check as output and the outstanding check may correspond to the missing check number. For example, the second machine learning classifier may output that check 103 may be related to a bi-annual payment of property tax to the City of Richmond. Given that the City of Richmond has failed to process various checks in the last month, check 103 may be an outstanding check that needs further attention.

Figure 5A:
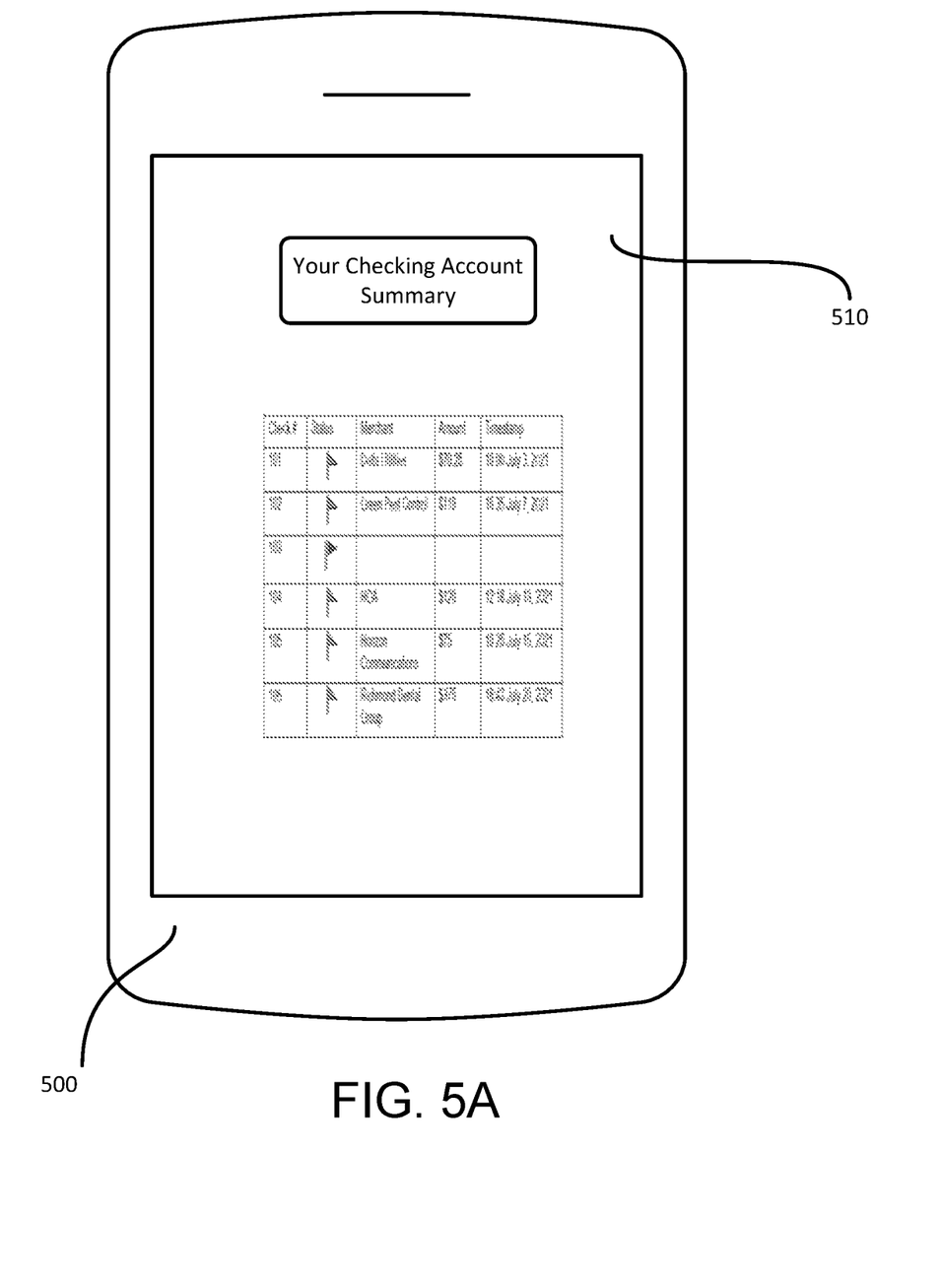
FIGS. 5A-5D show an example user interface for generating an outstanding check alert according to one or more aspects of the disclosure.

At step 418, an alert may be sent to a user device indicating the outstanding check. The alert generating server 130 may send a message to the user device 120 indicating the outstanding check. The alert generating server 130 may provide a user interface on the user device 120 associated with the user listing recently cleared checks and outstanding check. The alert generating server 130 may ask the user to confirm whether the check is indeed outstanding or void. For example, FIG. 5A illustrates an example user interface that may be presented to user device 500. A summary of the user's checking account may be listed in field 510, which may include six entries related to the user's checking account for the month of July 2021. Each entry may include a check number, a status, a merchant, a transaction amount and a timestamp that the check was processed by the merchant. Five checks with the check numbers 101, 102, 104, 105 and 106 have a green flag in its status field, indicating they have been processed by the corresponding merchants. Notably, check 103 has a red flag in its status field, indicating that the check has not been processed yet. The user may click on the red flag or the check 103 to select this entry to view further details.

Figure 5B:
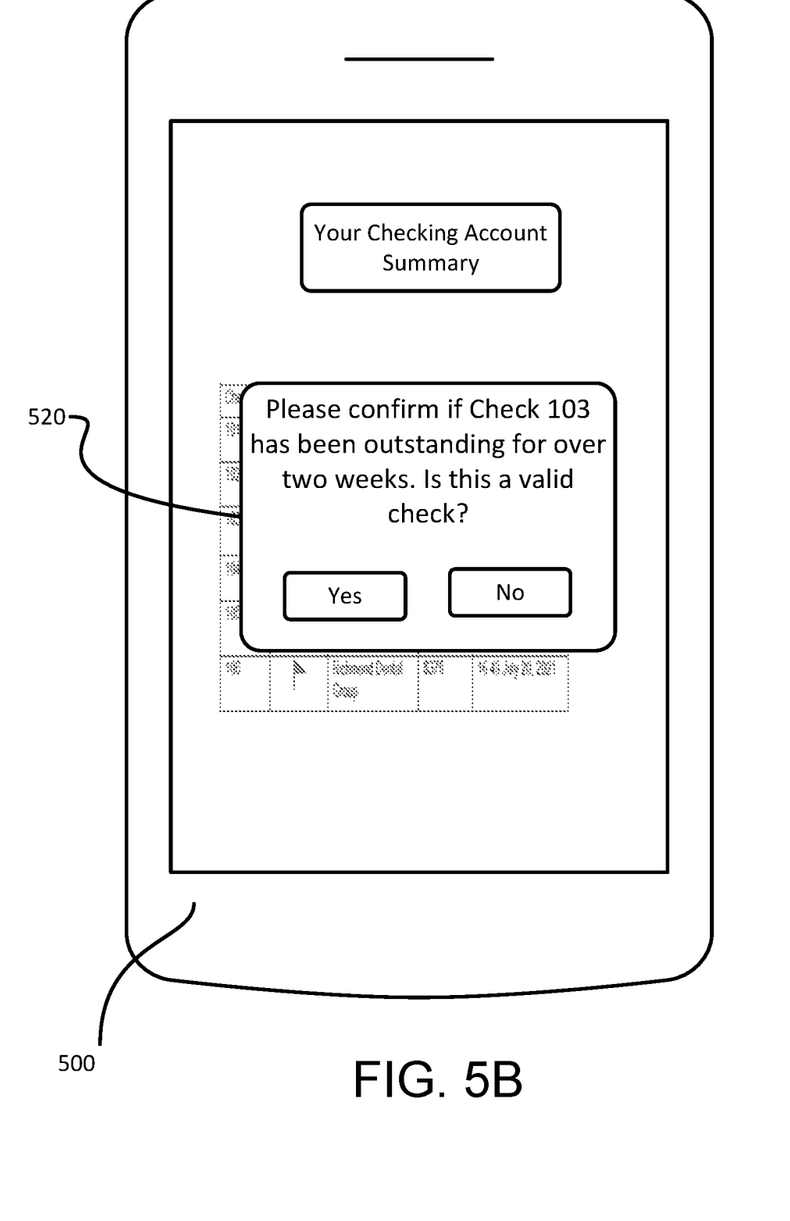

In a variety of embodiments, the alert generating server 130 may respond to the user selection and display an alert page such as illustrated in FIG. 5B. In the example of FIG. 5B, the alert generating server may display an alert 520 on user device 500. The alert may display that check 103 has been outstanding for over two weeks. The alert may also ask the user to confirm whether this is a valid check. If the user selects "No," the check may be void and no further action needs to be taken. If the user selects "Yes," the alert generating server 130 may display an action page in FIG. 5C.

Figure 5C:
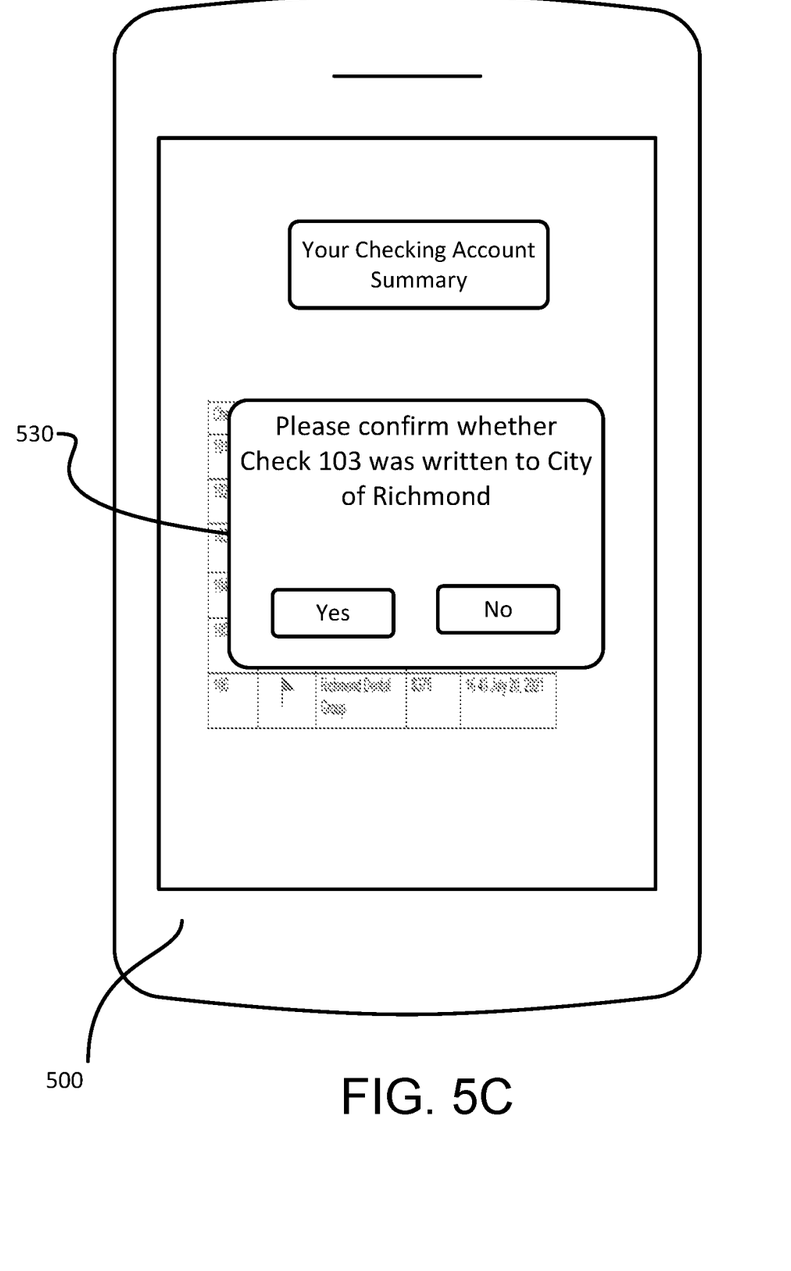

In the field 530 of FIG. 5C, the alert generating server 130 displays the message asking the user to confirm the merchant associated with outstanding check 103. The alert generating server 130 may incorporate user confirmation of an assumed target merchant (e.g., City of Richmond) as a default merchant. Alternatively, the alert generating server 130 may allow user selection of a target merchant based on user insight (e.g., what merchants the user has transacted with in the user's personal check register). As such, the alert generating server 130 may confirm the name of the merchant (e.g., City of Richmond) based on the aggregated information from a plurality of accounts. The alert generating server 130 may further allow the second machine learning classifier to be trained on additional missing check patterns through cross-customer learning. For example, message 530 may read "please confirm whether Check 103 was written to City of Richmond." The user may select "Yes" to confirm, or "No" to reject. Upon selecting "Yes", the alert may default to a known issue with the assumed target merchant (e.g., City of Richmond). Upon selecting "No," the alert may allow the user to select from a drop-down of valid values that may include distinct merchant targets from the user's individual checking account history, or allow free-form entry (not shown in FIG. 5C). The selection of an entry other than the default or an input of a free-form entry, particularly when the entry matches entries selected or entered by other customers, may create a pattern that may inform a new shared merchant issue.

In a variety of embodiments, the alert generating server 130 may reduce the risk of a "false positive" for a customer who paid City of Richmond's bill online and may happen to have a different outstanding check during the timeframe in question. The interface from a technology perspective may involve a drop-down window of distinct customer-specific target merchants drawn from individual account history, and the drop-down window may be linked to the EMI database to ensure data conformity. The intelligent drop-down may allow the customer to tell the second machine learning classifier who the customer wrote the check to. With such data point (and other customers with same data point), the alert generating server 130 may improve the feedback loop to the second machine learning classifier and provide further guidance in aggregate. For example, after the user opts away from the default alert and/or value of "The City of Richmond" and selects the merchant "Kroger" as a valid value, the alert trained against customers in aggregate may display "we've noticed some of our customers are experiencing a delay in processing from Kroger Grocery Store at 123 Broad Street in Richmond."

Figure 5D:
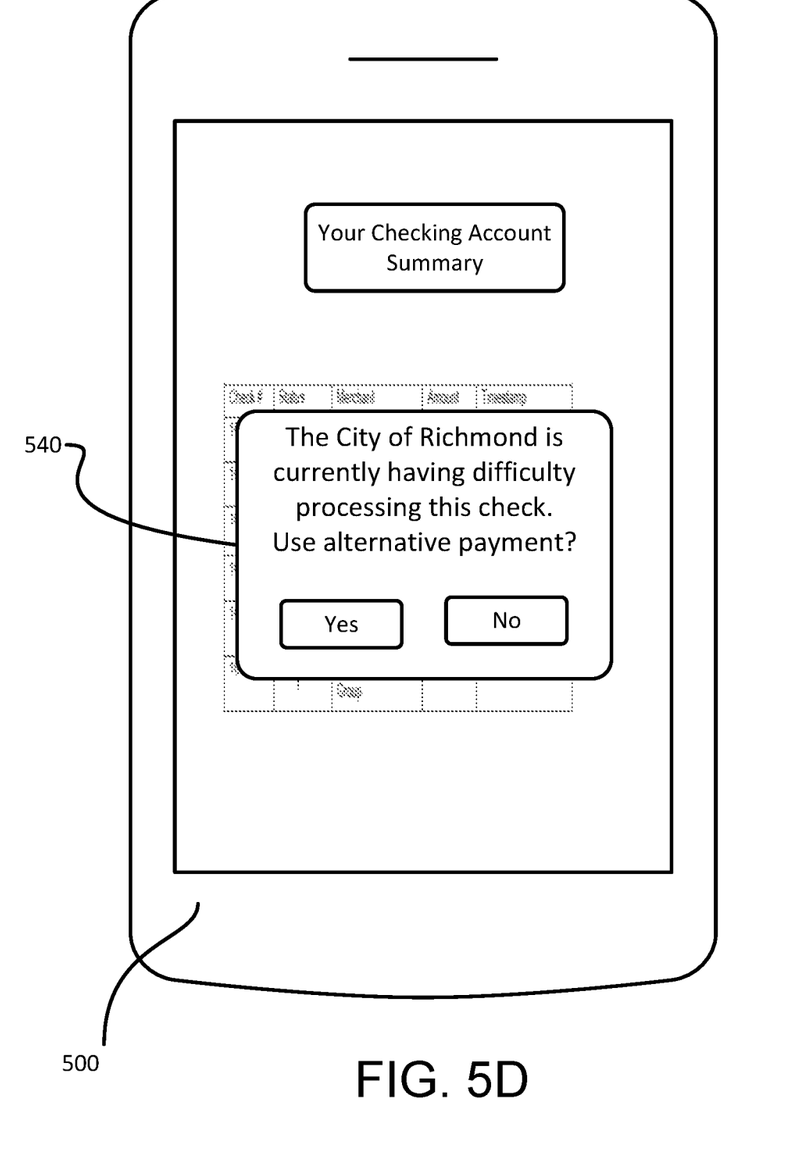

In FIG. 5C, when the user is asked to confirm whether Check 103 was written to City of Richmond, and the user selects "No," alert generating server 130 may provide an option to select an alternative payment. For example, FIG. 5D may display a message 540 "the City of Richmond is currently having difficulty processing this check. User alternative payment?" If the user selects "Yes," the user may be directed to a web page to make the payment to the City of Richmond using an online payment or using a payment card, such as a credit card. If the user selects "No," the alert generating server 130 may keep monitoring the status of check 103. The alert generating server 130 may send updated alerts periodically until the issue with the merchant is resolved.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML, or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a first device and from a plurality of users, transaction records associated with a plurality of checking accounts;
   determining, based on the transaction records and using a first machine learning classifier, a transaction pattern indicating one or more merchants have failed to process outstanding checks for a period of time;
   receiving sequential check information comprising at least one missing check number associated with a particular checking account;
   providing, as input to a second machine learning classifier, the transaction pattern indicating that the one or more merchants have failed to process outstanding checks and the sequential check information comprising at least one missing check number, wherein the second machine learning classifier is trained based on first training data comprising:
      pre-labelled checks indicating whether the pre-labelled checks have been cleared;
      check numbers associated with the pre-labelled checks, and
      timestamps that the pre-labelled checks were cleared;
   receiving, based on the transaction pattern and the sequential check information, and from the second machine learning classifier, at least one outstanding check associated with the particular checking account for the period of time;
   causing a user interface to be displayed on a second device associated with a first user, wherein the user interface comprises:
      a flag indicating the at least one outstanding check; and
      a field enabling the first user to input feedback information comprising a merchant name associated with the at least one outstanding check;
   receiving, from the second device, the feedback information comprising the merchant name associated with the at least one outstanding check;
   updating the second machine learning classifier based on the feedback information; and
   providing, to the second device, an option to select an alternative payment associated with the at least one outstanding check.

2. The computer-implemented method of claim 1, further comprising:
   prior to determining the transaction pattern, retrieving, by the first device and using a scraping algorithm, compiled information associated with merchants in a geographic area; and
   parsing the compiled information to identify one or more keywords,
   wherein determining the transaction pattern comprises determining, based on the one or more keywords and the transaction records, the transaction pattern that the merchant has failed to process outstanding checks for the period of time.

3. The computer-implemented method of claim 2, wherein parsing the compiled information further comprises:
   parsing the compiled information using natural language processing (NLP).

4. The computer-implemented method of claim 2, wherein parsing the compiled information further comprises:
   converting the compiled information from a first data format to a second data format; and
   analyzing compiled information in the second data format to determine the one or more keywords.

5. The computer-implemented method of claim 2, further comprising:
   determining the one or more keywords using term frequency-inverse document frequency (TFIDF) analysis.

6. The computer-implemented method of claim 2, wherein the compiled information comprises, for the geographic area, any of weather information, information associated with a disaster or information associated with a pandemic.

7. The computer-implemented method of claim 1, further comprising:
   prior to using the first machine learning classifier, training, using second training data comprising a set of pre-labelled outstanding checks, the first machine learning classifier to output a detected transaction pattern;
   providing, as input to the trained first machine learning classifier, the transaction records; and
   receiving, as output from the trained first machine learning classifier and based on the transaction records, the transaction pattern indicating the merchant has failed to process outstanding checks for the period of time.

8. The computer-implemented method of claim 1, wherein determining the at least one outstanding check comprises:
   analyzing historical transactions of the particular checking account, wherein the historical transactions comprise one or more recurring transactions; and
   determining the at least one outstanding check based on the one or more recurring transactions.

9. The computer-implemented method of claim 1, further comprising:
   sending, to the second device, a recommendation to use an at least one alternative payment method.

10. A computing device comprising:
   an enterprise merchant intelligence information database;
   one or more processors; and
   memory storing instructions that, when executed by the one or more processors, cause the computing device to:
      retrieve, using a scraping algorithm, compiled information associated with merchants in a geographic area;
      convert the compiled information from a first data format to a second data format;
      parse the compiled information in the second data format to determine one or more keywords;
      receive transaction records associated with a plurality of checking accounts;
      determine, based on the one or more keywords and the transaction records and using a first machine learning classifier, a transaction pattern indicating one or more merchants have failed to process outstanding checks for a period of time;

receive sequential check information comprising at least one missing check number associated with a particular checking account;

provide, as input to a second machine learning classifier, the transaction pattern indicating that the one or more merchants have failed to process outstanding checks and the sequential check information comprising at least one missing check number, wherein the second machine learning classifier is trained based on first training data comprising:

pre-labelled checks indicating whether the pre-labelled checks have been cleared;

check numbers associated with the pre-labelled checks, and timestamps that the pre-labelled checks were cleared;

receive, based on the transaction pattern and the sequential check information, and from the second machine learning classifier, at least one outstanding check associated with the particular checking account for the period of time;

cause, a user interface to be displayed on a first computing device associated with a first user, wherein the user interface comprises:

a flag indicating the at least one outstanding check; and a field enabling the first user to input feedback information comprising a merchant name associated with the at least one outstanding check;

receiving, from the first computing device, the feedback information comprising the merchant name associated with the at least one outstanding check;

updating the second machine learning classifier based on the feedback information; and providing, to the first computing device, an option to select an alternative payment associated with the at least one outstanding check.

11. The computing device of claim 10, wherein the instructions, when executed by the one or more processors, cause the computing device to:

parse the compiled information using natural language processing (NLP).

12. The computing device of claim 10, wherein the instructions, when executed by the one or more processors, cause the computing device to:

determine the one or more keywords using term frequency-inverse document frequency (TFIDF) analysis.

13. The computing device of claim 10, wherein the instructions, when executed by the one or more processors, cause the computing device to:

prior to using the first machine learning classifier, train, using second training data comprising a set of pre-labelled outstanding checks, a machine learning classifier to output a detected transaction pattern;

provide, as input to the trained machine learning classifier, the transaction records; and receive, as output from the trained machine learning classifier and based on the transaction records, the transaction pattern indicating the merchant has failed to process outstanding checks for the period of time.

14. The computing device of claim 10, wherein the instructions, when executed by the one or more processors, cause the computing device to:

prior to using the second machine learning classifier, train, using training data comprising a set of checks with corresponding check numbers that are out of sequence, a machine learning classifier to output predicted outstanding checks;

provide, as input to the trained machine learning classifier, the sequential check information; and receive, as output from the trained machine learning classifier and based on the sequential check information, the at least one outstanding check corresponding to the at least one missing check number for the period of time.

15. The computing device of claim 10, wherein the instructions, when executed by the one or more processors, cause the computing device to:

analyze historical transactions of the particular checking account, wherein the historical transactions comprise one or more recurring transactions; and determine the at least one outstanding check based on the one or more recurring transactions.

16. The computing device of claim 10, wherein the compiled information comprises, for the geographic area, any one of weather information, information associated with a disaster or information associated with a pandemic.

17. The computing device of claim 10, wherein the instructions, when executed by the one or more processors, cause the computing device to:

send, to the first user on the first computing device, a recommendation to use the alternative payment method.

18. One or more non-transitory media storing instructions that, when executed by one or more processors, cause the one or more processors to perform steps comprising:

retrieving, using a scraping algorithm, compiled information associated with merchants in a geographic area;

converting the compiled information from a first data format to a second data format;

parsing compiled information in the second data format to determine one or more keywords;

receiving transaction records associated with a plurality of checking accounts;

training, using a first training data comprising a set of pre-labelled outstanding checks, a first machine learning classifier to output detected transaction pattern;

providing, as input to the trained first machine learning classifier, the transaction records;

receiving, as output from the trained first machine learning classifier and based on the one or more keywords and the transaction records, a transaction pattern indicating one or more merchants have failed to process outstanding checks for a period of time;

receiving sequential check information comprising at least one missing check number associated with a particular checking account;

providing, as input to a second machine learning classifier, the transaction pattern indicating that the one or more merchants have failed to process outstanding checks and the sequential check information comprising at least one missing check number, wherein the second machine learning classifier is trained based on second training data comprising:

pre-labelled checks indicating whether the pre-labelled checks have been cleared;

check numbers associated with the pre-labelled checks, and timestamps that the pre-labelled checks were cleared;

receiving, based on the transaction pattern and the sequential check information, and from the second machine learning classifier, at least one outstanding check associated with the particular checking account for the period of time;

causing, a user interface to be displayed on a first computing device associated with a first user, wherein the user interface comprises:
  a flag indicating the at least one outstanding check; and
  a field enabling the first user to input feedback information comprising a merchant name associated with the at least one outstanding check;

receiving, from a second device, the feedback information comprising the merchant name associated with the at least one outstanding check;

updating the second machine learning classifier based on the feedback information; and providing, to the second device, an option to select an alternative payment associated with the at least one outstanding check.

19. The non-transitory media of claim 18, wherein the instructions, when executed by the one or more processors, cause the one or more processors to perform steps comprising:
  parsing the compiled information by using natural language processing (NLP).

20. The non-transitory media of claim 18, wherein the instructions, when executed by the one or more processors, cause the one or more processors to perform steps comprising:
  determining the one or more keywords using term frequency-inverse document frequency (TFIDF) analysis.

* * * * *